(12) United States Patent
Buesser et al.

(10) Patent No.: US 10,896,664 B1
(45) Date of Patent: Jan. 19, 2021

(54) PROVIDING ADVERSARIAL PROTECTION OF SPEECH IN AUDIO SIGNALS (71) Applicant: INTERNATIONAL BUSINESS MACHINES CORPORATION, Armonk, NY (US)

(72) Inventors: Beat Buesser, Ashtown (IE); Maria-Irina Nicolae, Dublin (IE); Ambrish Rawat, Dublin (IE); Mathieu Sinn, Dublin (IE); Ngoc Minh Tran, Dublin (IE); Martin Wistuba, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/601,468

(22) Filed: Oct. 14, 2019

(51) Int. Cl.
*G10K 11/175* (2006.01)
*G10L 15/22* (2006.01)
*G10L 25/30* (2013.01)

(52) U.S. Cl.
CPC ............ *G10K 11/175* (2013.01); *G10L 15/22* (2013.01); *G10L 25/30* (2013.01); *G10L 2015/223* (2013.01)

(58) Field of Classification Search
CPC ............... G06F 21/606; H04L 63/1466; H04L 63/1416; H04L 63/0428; H04L 63/1441; H04L 63/0421; H04L 63/123; G10L 19/018; G10L 15/1807; G10L 25/48
See application file for complete search history.

(56) References Cited

U.S. PATENT DOCUMENTS

| | | | |
|---|---|---|---|
| 7,376,558 B2 | 5/2008 | Gemello et al. | |
| 8,032,372 B1 | 10/2011 | Zimmerman et al. | |
| 8,868,420 B1 | 10/2014 | Terrell, II et al. | |
| 9,390,725 B2 | 7/2016 | Graham | |
| 9,564,139 B2 | 2/2017 | Radhakrishnan et al. | |
| 9,704,509 B2 | 7/2017 | Konjeti et al. | |
| 9,954,803 B1 | 4/2018 | Kominar | |
| 2005/0175180 A1* | 8/2005 | Venkatesan | H04L 9/12 380/268 |
| 2007/0150261 A1 | 6/2007 | Ozawa | |
| 2015/0257001 A1* | 9/2015 | Balasubramaniyan | H04L 43/0829 455/411 |
| 2016/0171974 A1 | 6/2016 | Hannun et al. | |
| 2018/0241727 A1* | 8/2018 | Verzun | G06F 21/606 |

OTHER PUBLICATIONS

"Hidden Voice Commands" Authors: Carlini et al. SEC'16 Proceedings of the 25th USENIX Conference on Security Symposium. Austin TX USA Aug. 10-12, 2016 pp. 513-530 (18 Pages).
"Dolphin Attack:laudible Voice Commands" Zhang et al CCS '17, Oct. 30-Nov. 3, 2017, Dallas, TX, USA © 2017 Association for Computing Machinery. (15 Pages).

(Continued)

*Primary Examiner* — Yogeshkumar Patel
(74) *Attorney, Agent, or Firm* — Griffiths & Seaton PLLC (57) ABSTRACT

Embodiments for providing adversarial protection of speech in audio signals by a processor. Security defenses on one or more audio devices may be provide against automated audio analysis of audio signals by using adversarial noise.

20 Claims, 8 Drawing Sheets

(56) References Cited

OTHER PUBLICATIONS

"Audio Adversarial Examples: Targeted Attacks on Speech-to-Text" Carlini et al. University of California Berkley Mar. 30, 2018 (7 Pages).
"Adversarial Robustness Toolbox v0.4.0" Nicolae et al. Jan. 11, 2019 (41 Pages).
"State-of-the-Art Speech Recognition With Sequence-to-Sequence Models" Chiu et al. Google USA Feb. 23, 2018 (5 Pages).
"Listen, Attend and Spell" Chan, Carnegie Mellon University Aug. 20, 2015 (16 Pages).

* cited by examiner

PROVIDING ADVERSARIAL PROTECTION OF SPEECH IN AUDIO SIGNALS

BACKGROUND OF THE INVENTION

Field of the Invention

The present invention relates in general to computing systems, and more particularly to, various embodiments for providing adversarial protection of speech in audio signals.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information. Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, the greater the need to make progress in these systems advantageous for efficiency and improvement.

SUMMARY OF THE INVENTION

Various embodiments for providing adversarial protection of speech in audio signals by a processor, are provided. In one embodiment, by way of example only, a method for providing adversarial protection of speech in audio signals, again by a processor, is provided. Security defenses on one or more audio devices may be provide against automated audio analysis of audio signals by using adversarial noise.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

Accordingly, the prolific increase in use of IoT devices, mobile communication devices (e.g., smart phones, tablets, smart watches, or computers themselves, etc.) in computing systems, particularly within the cloud computing environment, in a variety of settings provide various beneficial uses to a user.

For example, many users use one or more application on various computing systems such as, for example, on a mobile device with a microphone for verbal communication with other users via a telecommunication or computer network. Some computing systems may use artificial intelligence ("AI") and enables the automated analysis of massive amounts of audio signals. In particular, speech-to-text models allow to transcribe spoken language into text format, which can be used in further processing, like clustering, text mining, filtering by key words, etc. A malicious adversary intercepting transmissions of audio signals that contain speech or accessing them stored in databases may result in interception data and violation of data privacy, which may result in negative consequences (e.g., theft of intellectual property or even industrial espionage) directed at the user or recipients of the intended communication.

Accordingly, various embodiments depicted herein provide a novel solution to preserve and protect audible data by providing adversarial protection of speech in audio signals. In one aspect, security defenses on one or more audio devices may be provide against automated audio analysis of audio signals by using adversarial noise, an adversarial patch, or a combination thereof. In one aspect, a target or "boundary" region (e.g., an entire portion of the screen/display or one or more selected regions) may be selected for capturing the digital or analog audio signals for providing the adversarial noise to the digital or analog audio signals. The adversarial noise may be determined, computed, and/or selected.

The adversarial noise may be directed at misclassifications at different levels such as, for example, at a phoneme-level, word-level, and/or the sentence level. For example, at the phoneme-level, the adversarial noise may be directed to misclassify individual phonemes either as silence or randomly distorted phonemes (which will result in "unintelligible" transcriptions). At the word-level, the adversarial noise may be directed to misclassify entire words (e.g., potentially distorting the grammar). At the sentence-level, the adversarial noise may be directed misclassify entire sentences.

The present invention may introduce adversarial noise at the word or sentence level prohibiting interception of the audio signal and deters a system from automatically detecting that adversarial noise thereby enhancing data privacy and protection (e.g., the adversarial noise is an added layer of protection).

Since the adversarial noise may causes some latency in the communication, a complete word/sentence may be required to be communicated (e.g., spoken or uttered) before the adversarial noise can be created and added to the audio signal. However, by introducing adversarial noise at the phoneme-level, only very small latencies (e.g., 10 milliseconds "ms" for standard speech-to-text systems).

A user may specify, as input, the adversarial defense strength of the adversarial noise that should be applied to the speech in audio signals.

The adversarial noise strength may be adjusted (e.g., by a user using an input device and/or a machine learning operation). The noise strength may be increased and/or decreased according to a degree in which the noise strength affects the quality of the audio signal. For example, the noise strength may be adjusted to a larger adversarial noise levels, which provides increased degrees of security (since they cause more difficulties for computer systems to correctly classify audio signals). The adversarial noise strength may also be implemented, for example, as a fraction of time of an entire audio recording where the adversarial defense is actively modifying the original signal (e.g., window length, acceptable delays, interval frequency, etc.)

Again, increasing or decreasing the adversarial noise strength may affect the quality of the audio signal (e.g., a smaller/weaker adversarial noise level) such as, for example, where a user or 3rd party entity does not notice (e.g., is not aware) the audible noise. Alternatively, the noise strength may be adjusted to a level (e.g., a larger/stronger level) where a user or $3^{rd}$ party entity perceive artifacts, but would still be able understand the communication/spoken content of the audio.

In an additional aspect, the present invention may also play the adversarial noise over an audio/communication device (e.g., a speaker) and record it over the audio capturing device (e.g., microphone) together with the speech so as to avoid the automated analysis of audio signals intercepted from hacked audio capturing devices.

The present invention may also report an estimate of a current defense strength (e.g., similar to battery charging status and may be an estimate of the effectiveness of the current defense strength).

Thus, the present invention secures and protects data (e.g., personal/proprietary information) against automatic analysis of audio signals inappropriately obtained through interception, eavesdropping, and/or unauthorized access to one or more databases (e.g., audio databases).

The present invention may also report an estimate of a current defense strength (e.g., similar to battery charging status and may be an estimate of the effectiveness of the current defense strength).

In an additional aspect, the present invention may modify digital or analog audio signals captured by an audio capturing device (e.g., a microphone) by adding adversarial noise to the digital or analog audio signals. The adversarial noise may cause a misclassifications of the digital or analog audio signals by speech-to-text models. For example, the adversarial noise may cause the speech-to-text models to be unable to detect any speech at all (e.g., the speech-to-text models will transcribe silence). The adversarial noise may cause the speech-to-text operations/models to transcribe random utterances. The adversarial noise may cause the speech-to-text models to produce targeted transcriptions (e.g., the noise can be designed such that the utterance of the word "patent" is transcribed as "toaster"). The addition of adversarial noise prevents computer systems from automatically parsing and analyzing spoken content in the audio signal. It should be noted that the adversarial noise applied to the digital or analog audio signals affects the automated processing of the audio signal, but is low enough for organisms (e.g., humans) to still understand the utterances and in most cases not even notice any added noises.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
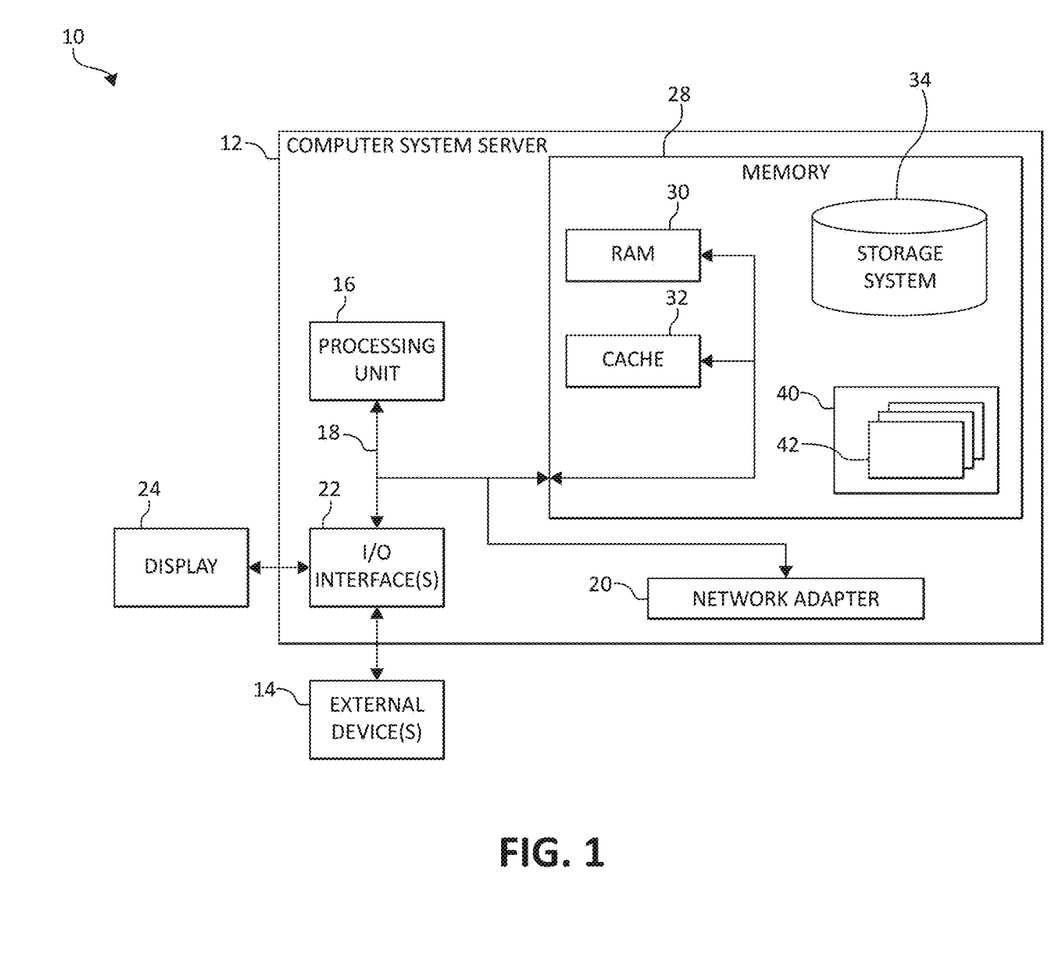
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
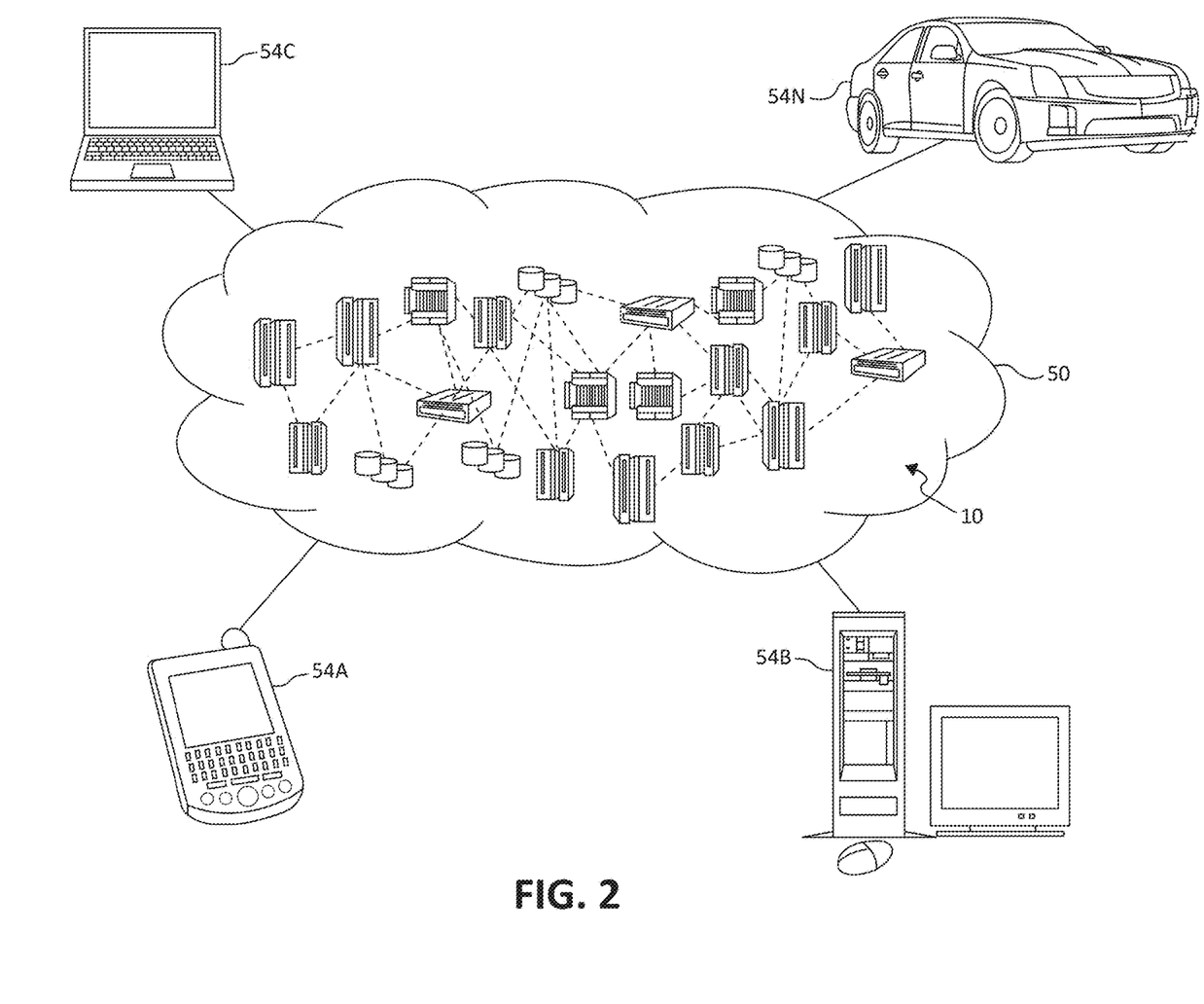
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
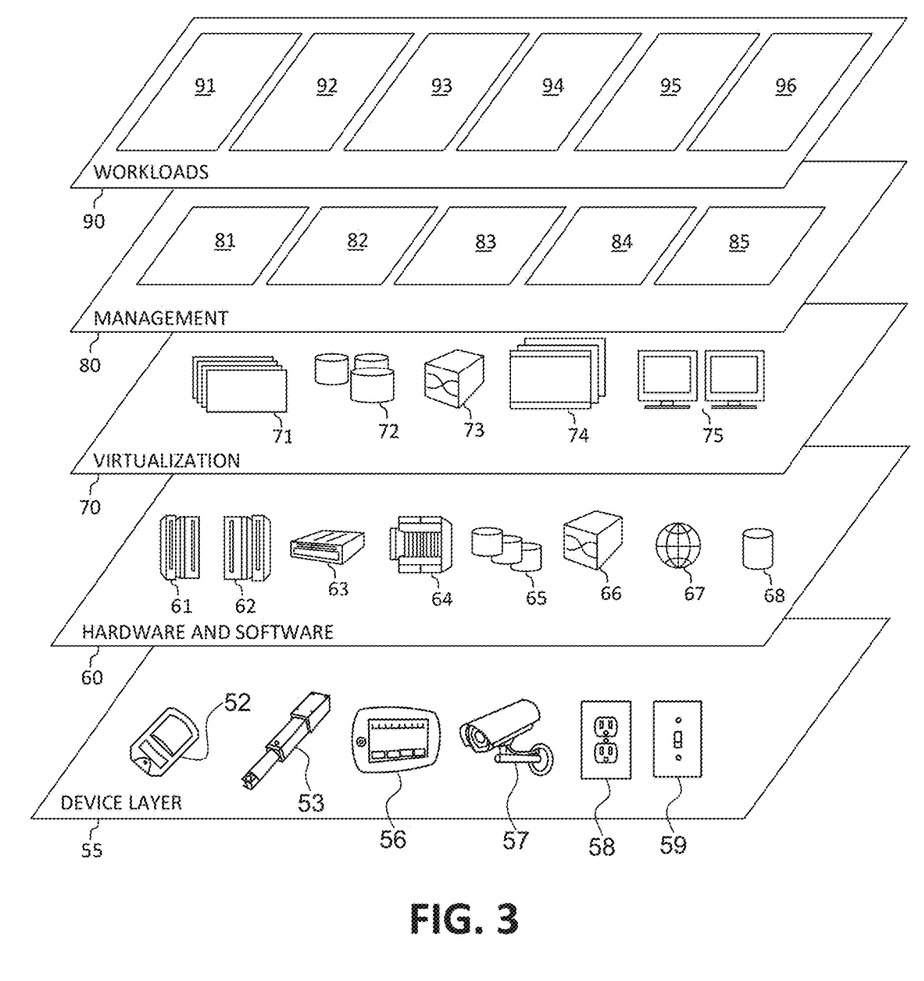
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices using workloads and functions 96 for providing adversarial protection in audio signals. In addition, workloads and functions 96 for providing adversarial protection in audio signals may include such operations as data analysis (including data collection and processing from various environmental sensors), image analysis, task and device analysis, and/or data analytics functions. One of ordinary skill in the art will appreciate that workloads and functions 96 for providing adversarial protection in audio signals may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
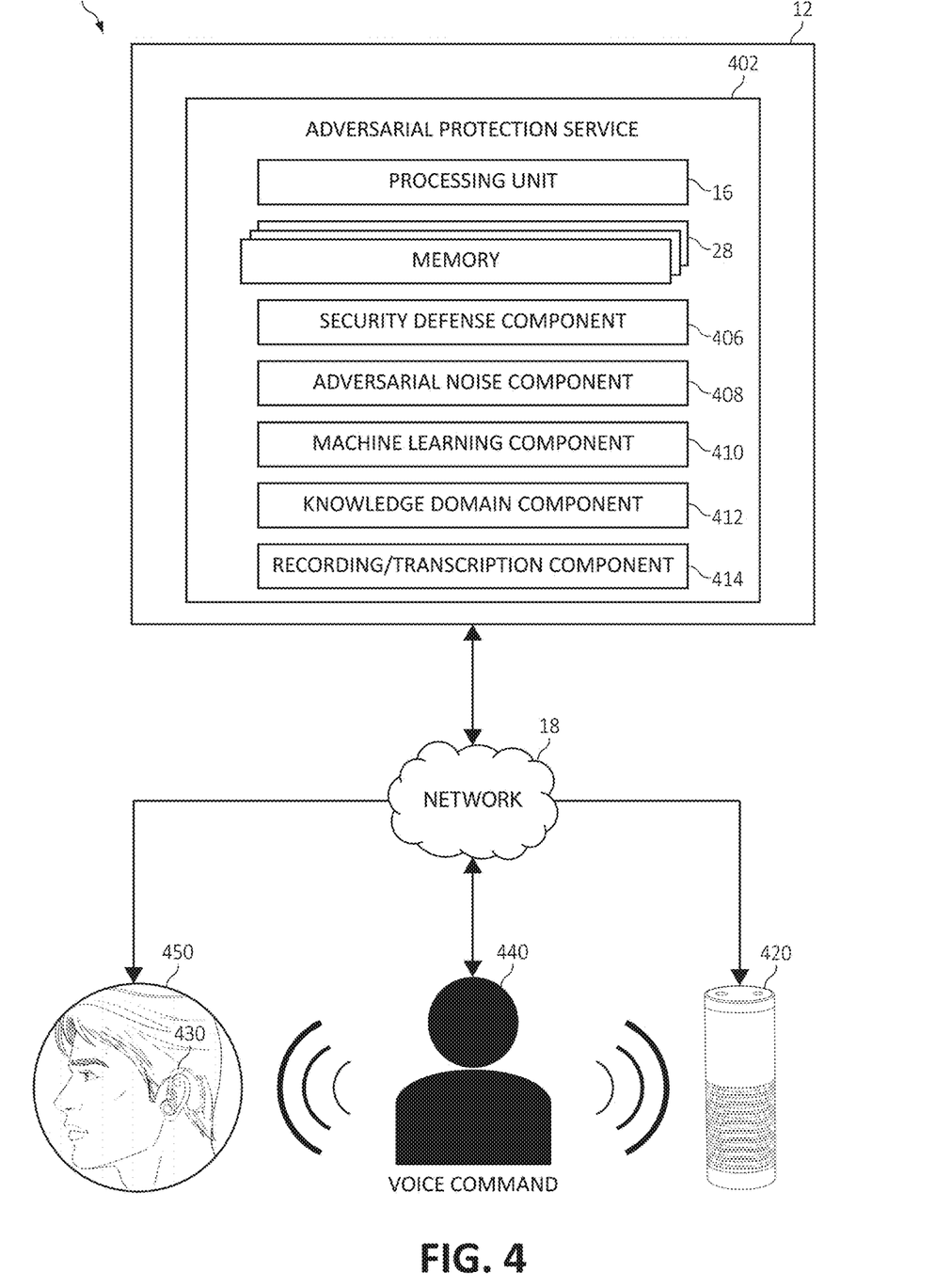
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, which may incorporate an intelligent adversarial protection service 402.

In one aspect, the computer system/server 12 may provide virtualized computing services (i.e., virtualized computing, virtualized storage, virtualized networking, etc.) to one or more computing devices, as described herein. More specifically, the computer system/server 12 may provide virtualized computing, virtualized storage, virtualized networking and other virtualized services that are executing on a hardware substrate.

In one aspect, the computer system/server 12 may provide an adversarial protection service 402 (e.g., intelligent adversarial protection service 402), which may be in communication with and/or association with one or more computing devices such as, for example, an intelligent audio capturing/generating device 430 (e.g., hearing aid, microphone, speaker, communication device, etc.) and/or a user equipment 420 (e.g., an internet of things "IoT" computing device or other type of audio generating or capturing devices such as, for example, a camera, television, smart phone, smart watch, desktop computer, laptop computer, tablet, smart watch and/or another electronic device that may have one or more processors, memory, and/or wireless communication technology).

The intelligent adversarial protection service 402, the intelligent audio capturing/generating device 430, and/or the user equipment 420 may each be associated with and/or in communication with each other, by one or more communication methods, such as a computing network, wireless communication network, or other network means enabling communication (each collectively referred to in FIG. 4 as "network" 18). In one aspect, the intelligent adversarial protection service 402 may be installed locally on the intelligent audio capturing/generating device 430 and/or the user equipment 420. Alternatively, the intelligent adversarial protection service 402 may be located external to (e.g., via a cloud computing server) each of the intelligent audio capturing/generating device 430 and/or the user equipment 420.

The intelligent adversarial protection service 402 may incorporate processing unit 16 to perform various computational, data processing and other functionality in accordance with various aspects of the present invention. A database of preferences and interests 404 (e.g., a knowledge domain or ontology) is shown, along with a security defense component 406, an adversarial noise component 408, a machine learning component 410, and/or a recording/transcription component 414.

The security defense component 406 may provide security defenses on one or more audio devices against automated audio analysis of audio signals using adversarial noise. The security defense component 406, in association with the adversarial noise component 408, may apply the adversarial noise to one or more display frames of the one or more image display devices. In so doing, the adversarial noise component 408 may determine or select a type of the adversarial noise to implement on digital audio signals, analog audio signals, or a combination thereof. The security defense component 406, in association with the adversarial noise component 408, may then apply the adversarial noise to a communication (e.g., communication data at the phoneme-level, the word-level, and/or the sentence-level, etc.) in a digital audio signal, an analog audio signal, or a combination thereof.

In an additional aspect, the security defense component 406, in association with the machine learning component 410, may analyze the audio signals using a machine learning operation. In one aspect, the audio signals may be communicated and transmitted in real-time from a user and/or from a recorded message located in an audio database such as, for example, in the knowledge domain component 412.

The security defense component 406, in association with the machine learning component 410, may estimate a theoretical security defense strength of the adversarial noise. The security defense component 406, in association with the machine learning component 410, may estimate an actual security defense strength of the adversarial noise via a feedback loop operation. The security defense component 406 may adjust a degree of security defense strength of the adversarial noise.

It should be noted that the theoretical defense strength is determined by estimating a level or degree of performance degradation (e.g., how much the performance of speech-to-text AI models would degrade) as a function of the current noise level. Such estimates may be based on offline measurements. The actual defense strength may determine the difference in the output of the speech-to-text AI models on the audio signal with and without the adversarial noise. The actual defense strength may be computationally more expensive to obtain over the theoretical defense strength, on the other hand it is a more accurate measure of the effectiveness of the current noise level.

The database of audio files, recordings, and/or transcriptions may include and/or be associated the knowledge domain 412, which may be an ontology of concepts, keywords, expressions representing a domain of knowledge. For example, all recorded audio files may be classified, organized, and/or saved/retrieved based on the type of communication within the audio files/recordings. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects. The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the knowledge domain 412 may include one or more external resources such as, for example, links to one or more Internet domains, webpages, and the like. For example, text data may be hyperlinked to a webpage that may describe, explain, or provide additional information relating to the audio data.

In an additional aspect, the security defense component 406 of the computer system/server 12 may work in concert with processing unit 16 to accomplish various aspects of the present invention. For example, security defense component 406 may undergo various data analytics functions to analyze audio data communicated from one or more devices such as, for example, the user equipment 420 and/or the intelligent audio capturing/generating device 430.

The security defense component 406 may receive and analyze each physical property associated with audio data. The security defense component 406 may cognitively receive and/or detect audio data (e.g., audio data that may be transcribed) for the user equipment 420 and/or the intelligent audio capturing/generating device 430.

The security defense component 406, the adversarial noise component 408, and/or the machine learning component 410 may access and monitor one or more audio data sources such as, for example, the user equipment 420 and/or the intelligent audio capturing/generating device 430 (e.g., a radio, telephone, television, computer, etc.) to detect the audio data. For example, the user equipment 420 and/or the intelligent audio capturing/generating device 430 may be broadcasting communication from a user 440 (e.g., a voice command). The security defense component 406, the adversarial noise component 408, and/or the machine learning component 410, which may be monitoring and accessing communications (e.g., a voice command) from one or more users.

As part of detecting the audio data, the security defense component 406, the adversarial noise component 408, and/or the machine learning component 410 may identify, from the audio data, one or more sources of the audio data, contextual factors associated with the of the audio data, one or more characteristics of the audio data, one or more semantic phrases, sentences, words of the user, or a combination thereof.

The recording/transcription component 414 may also dynamically record and store the audio data communication from a user 440. For example, the machine learning may learn and record each communication/audio data created by and/or directed to user 440. The recording/transcription component 414 may then record communication data (e.g., record, transcribe, and/or save an audio transcript), extract one or more keywords/phrases, and/or use NLP to transcribe the speech-to-text form. Also, words, phrases, and/or compete sentences (e.g., all or portions of a conversation) by other parties relating to the audio data may be transcribed in a text form based on an NLP extraction operation (e.g., NLP based keyword extraction). The text data may be relayed, sent, stored, or further processed so that the same audio data (e.g., all or portions of the conversations) may be heard or listened to by the adversarial protection service 402 at a later point of time.

Accordingly, the security defense component 406, in association with the adversarial noise component 408 and/or machine learning component 410, may modify all or portions of the audio data (e.g., speech-to-text data). The security defense component 406, in association with the adversarial noise component 408 and/or machine learning component 410, may even send an alert to the user 440 indicating the application of the adversarial noise. The user 440 may then adjust (e.g., increase and/or decrease) the strength level of the adversarial noise.

Figure 5:
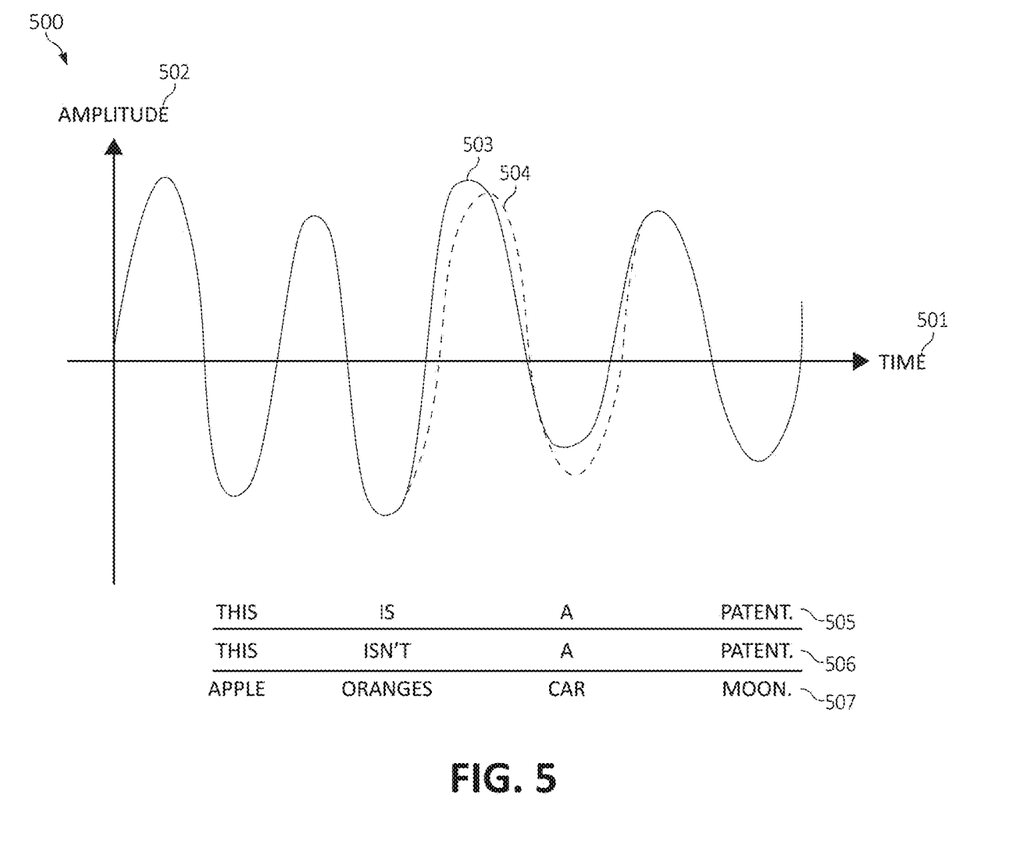
FIG. 5 is diagram depicting an additional exemplary operation for providing adversarial protection of speech in audio signals by a processor, again in which aspects of the present invention may be realized.

Turning now to FIG. 5, graph diagram 500 depicts an exemplary operation for providing adversarial protection of speech in audio signals. That is, graph diagram 500 depicts a schematic representation of adversarial attack on an audio signal. In one aspect, each of the devices, components, modules, and/or functions described in FIGS. 1-4 may also apply to the devices, components, modules, and functions of FIG. 5. Also, one or more components, functionalities, and/or features of FIGS. 1-4 may be implemented in FIG. 4. Repetitive description of like elements, components, modules, services, applications, and/or functions employed in other embodiments described herein is omitted for sake of brevity.

In one aspect, the X-axis 501 of the graph diagram 500 represents time and the Y-axis 502 represents amplitude or signal strength of an audio signal. An original audio signal 503 (e.g., benign and which may be analog or digital) is represented as a solid line. Adversarial audio signal 504 is represented as a dashed line and is modified using adversarial noise.

Upon application of the adversarial noise, the output sentence 505 corresponds to the original audio signal 503 such as, for example, obtained from speech-to-text models (e.g., recurrent neural networks, etc.) taking the original audio signal 503 as input.

Output sentence 506 is created by a speech-to-text model (e.g., recurrent neural networks, etc.) using an audio signal while applying the targeted adversarial noise defense as input. This results in small subtle changes to the output sentence 506 that are hard to detect by humans. However, output sentence 507 is created by a speech-to-text model (e.g., recurrent neural networks, etc.) using an audio signal with untargeted adversarial noise defense as input. This results completely random changes to the input sentence. Thus, output sentence 506 and output sentence 507 illustrate the resulting output sentences based upon a degree or level of the adversarial noise strength applied to the adversarial audio signal 504.

Thus, the adversarial audio signal 504 is the result of the modifying the original audio signal 503, which may be captured by an audio capturing device and may be digital or analog, by applying the adversarial noise.

Figure 6:
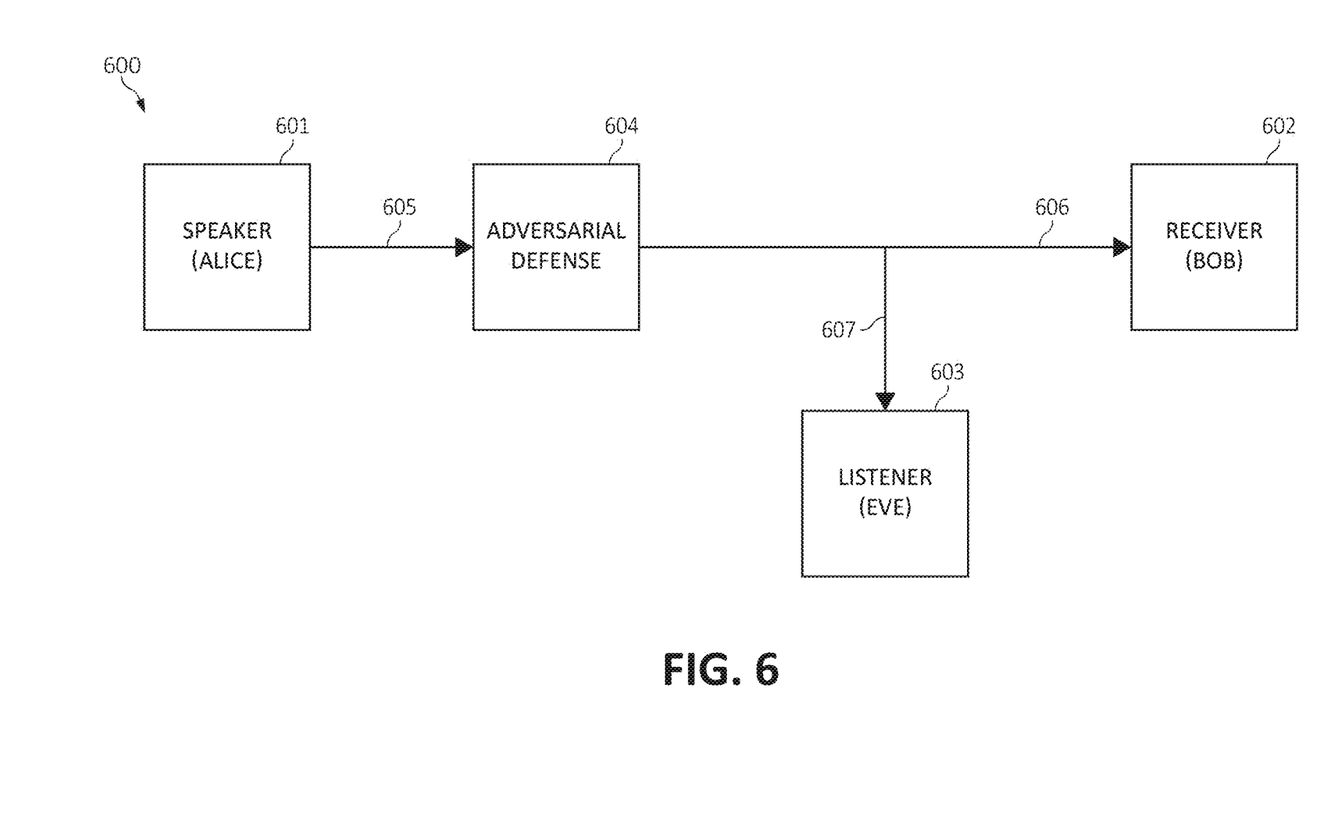
FIG. 6 is diagram depicting an additional exemplary operation for providing adversarial protection of speech in audio signals by a processor, again in which aspects of the present invention may be realized.

Turning now to FIG. 6, diagram depicts an exemplary attack vector operations 600 operation for providing adversarial protection of speech in audio signals. In one aspect, each of the devices, components, modules, and/or functions described in FIGS. 1-4 may also apply to the devices, components, modules, and functions of FIG. 6. Also, one or more components, functionalities, and/or features of FIGS. 1-4 may be implemented in FIG. 4. Repetitive description of like elements, components, modules, services, applications, and/or functions employed in other embodiments described herein is omitted for sake of brevity.

In operation, attack vector operations 600 includes a user 601 (e.g., the user/speaker identified as "Alice") recording an audio signal and desire to transmit and/or store the audio signal in a database. An audio capturing/generating device 605 (e.g., microphone) may record/transcribe the audio message provided by user 601 with, for example, a microphone/machine learning operation, and may communicate, transmit, and/or send the created audio signal to the adversarial security defense component 604.

The adversarial security defense component 604 may add a selected level of adversarial noise (e.g., add the adversarial noise at the phoneme-level, word-level, and/or the sentence level) to the original audio signal communicated by user 601 with minimal or no changes to the represented original audio signal (e.g., speech) and without impacts on the understanding of the message for a receive 602 (e.g., user "Bob). The adversarial security defense component 604 may communicate, transmit, store and/or send the created adversarially protected audio signal (e.g., audio signal with the applied adversarial noise) to receiver 602, as in block 606. The adversarial security defense component 604 may also estimate a current adversarial noise strength level by analyzing the adversarially protected audio signal and modifies the adversarially protected audio signal prior to communicating, transmitting, storing and/or sending the created adversarially protected audio signal. In one aspect, a feedback loop may be used via the audio capturing/generating device 605 (e.g., microphone) to assist with analyzing and/or estimated the adversarial noise strength level.

The receiver 602 (e.g., a user identified as "Bob") may be receiving the audio signal and may understand the message communicated by user 601. An adversary 603 (e.g., an adversarial listener "Eve") is listening to the transmitted and/or stored message between user 601 and receiver 602 and is using machine learning models to analyze the audio signal.

The adversary 603, accessing the transmission or stored adversarially protected audio signal attempts to apply an automated analysis operation trying to classify the stolen adversarially protected audio signal. However, the adversarial noise applied to the adversarially protected audio signal interferes with the automated analysis and/or reduces the success rate of the automated analysis thereby preserving and protecting the audio signal communicated by user 601.

Figure 7:
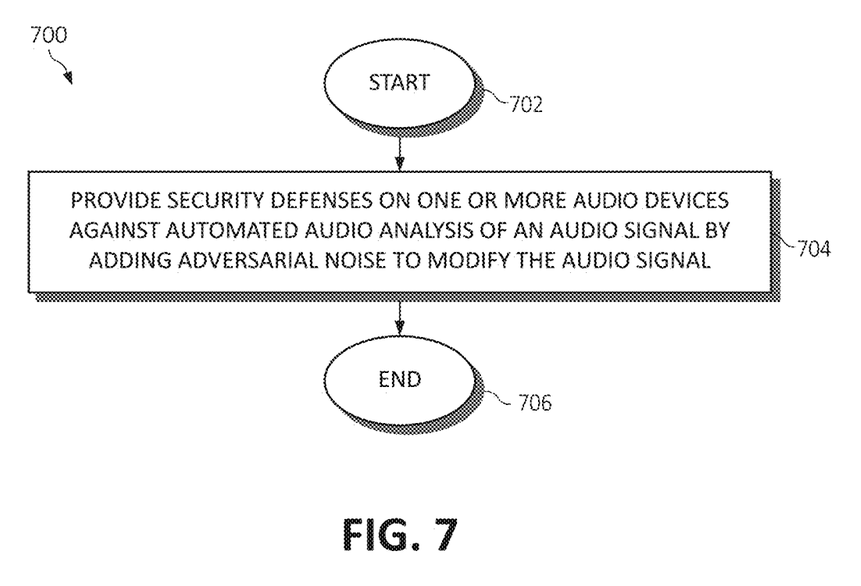
FIG. 7 is a flowchart diagram depicting an exemplary method for providing adversarial protection of speech in audio signals by a processor; again in which aspects of the present invention may be realized.

Turning now to FIG. 7, an additional method 700 for providing adversarial protection in audio signals by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A security defense may be provided on one or more audio devices against automated audio analysis of audio signals by using adversarial noise, as in block 704. The functionality 700 may end in block 706.

Figure 8:
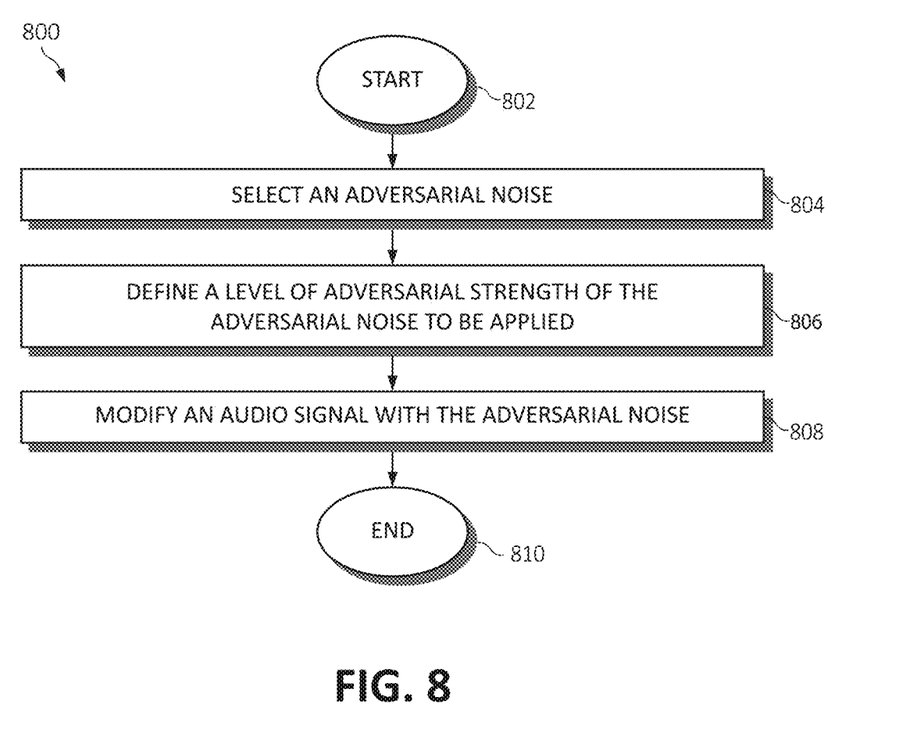
FIG. 8 is an additional flowchart diagram depicting an exemplary method for providing adversarial protection of speech in audio signals by a processor; again in which aspects of the present invention may be realized.

Turning now to FIG. 8, an additional method 800 for providing adversarial protection in audio signals by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

An adversarial noise may be selected, as in block 804. A level of adversarial noise strength of the adversarial noise may be applied to an audio signal, as in block 806. The audio signal may be modified with the adversarial noise, as in block 808. The functionality 800 may end in block 810.

In one aspect, in conjunction with and/or as part of at least one block of FIG. 7 or 8, the operations of methods 700 and/or 800 may include each of the following. The operations of methods 700 and/or 800 may apply the adversarial noise to a digital audio signal, an analog audio signal, or a combination thereof, and/or determine or select a type of the adversarial noise to implement on a digital audio signal, an analog audio signal, or a combination thereof in a communication.

The operations of methods 700 and/or 800 may analyze the audio signals using a machine learning operation, wherein the audio signals are communicated and transmitted in real-time from a user or from a recorded message located in an audio database.

The operations of methods 700 and/or 800 may estimate a theoretical security defense strength of the adversarial noise, and/or estimate an actual security defense strength of the adversarial noise via a feedback loop operation. The operations of methods 700 and/or 800 may adjust a degree of security defense strength of the adversarial noise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for providing adversarial protection in audio signals, comprising:
   providing security defenses on one or more audio devices against automated audio analysis of audio signals by embedding an adversarial noise within the audio signals containing speech such that the adversarial noise distorts the speech to prevent the automated audio analysis thereof, wherein the adversarial noise is embedded to target misclassification of the speech by the automated audio analysis at one of a phoneme-level, a word-level, and a sentence-level notwithstanding the speech is maintained to be intelligible by a user.

2. The method of claim 1, further including applying the adversarial noise to a digital audio signal, an analog audio signal, or a combination thereof.

3. The method of claim 1, further including determining or selecting a type of the adversarial noise to implement on a digital audio signal, an analog audio signal, or a combination thereof in a communication.

4. The method of claim 1, further including analyzing the audio signals using a machine learning operation, wherein the audio signals are communicated and transmitted in real-time from the user or from a recorded message located in an audio database.

5. The method of claim 1, further including estimating a theoretical security defense strength of the adversarial noise.

6. The method of claim 1, further including estimating an actual security defense strength of the adversarial noise via a feedback loop operation.

7. The method of claim 1, further including adjusting a degree of security defense strength of the adversarial noise.

8. A system for providing adversarial protection in audio signals, comprising:
   one or more computers with executable instructions that when executed cause the system to:
      provide security defenses on one or more audio devices against automated audio analysis of audio signals by embedding an adversarial noise within the audio signals containing speech such that the adversarial noise distorts the speech to prevent the automated audio analysis thereof, wherein the adversarial noise is embedded to target misclassification of the speech by the automated audio analysis at one of a phoneme-level, a word-level, and a sentence-level notwithstanding the speech is maintained to be intelligible by a user.

9. The system of claim 8, wherein the executable instructions apply the adversarial noise to a digital audio signal, an analog audio signal, or a combination thereof.

10. The system of claim 8, wherein the executable instructions determine or select a type of the adversarial noise to implement on a digital audio signal, an analog audio signal, or a combination thereof in a communication.

11. The system of claim 8, wherein the executable instructions analyze the audio signals using a machine learning operation, wherein the audio signals are communicated and transmitted in real-time from the user or from a recorded message located in an audio database.

12. The system of claim 8, wherein the executable instructions estimate a theoretical security defense strength of the adversarial noise.

13. The system of claim 8, wherein the executable instructions estimate an actual security defense strength of the adversarial noise via a feedback loop operation.

14. The system of claim 8, wherein the executable instructions adjust a degree of security defense strength of the adversarial noise.

15. A computer program product, for providing adversarial protection in audio signals by one or more processors, the computer program product comprising a non-transitory computer-readable storage medium having computer-readable program code portions stored therein, the computer-readable program code portions comprising:

an executable portion that provides security defenses on one or more audio devices against automated audio analysis of audio signals by embedding an adversarial noise within the audio signals containing speech such that the adversarial noise distorts the speech to prevent the automated audio analysis thereof, wherein the adversarial noise is embedded to target misclassification of the speech by the automated audio analysis at one of a phoneme-level, a word-level, and a sentence-level notwithstanding the speech is maintained to be intelligible by a user.

16. The computer program product of claim 15, further including an executable portion that applies the adversarial noise to a digital audio signal, an analog audio signal, or a combination thereof.

17. The computer program product of claim 15, further including an executable portion that determines or selects a type of the adversarial noise to implement on a digital audio signal, an analog audio signal, or a combination thereof in a communication.

18. The computer program product of claim 15, further including an executable portion that analyzes the audio signals using a machine learning operation, wherein the audio signals are communicated and transmitted in real-time from the user or from a recorded message located in an audio database.

19. The computer program product of claim 15, further including an executable portion that:
estimates a theoretical security defense strength of the adversarial noise; or
estimates an actual security defense strength of the adversarial noise via a feedback loop operation.

20. The computer program product of claim 15, further including an executable portion that adjusts a degree of security defense strength of the adversarial noise.

\* \* \* \* \*